(12) United States Patent
Martin et al.

(10) Patent No.: US 11,044,188 B2
(45) Date of Patent: Jun. 22, 2021

(54) AUTOMATED TESTING OF PUSH NOTIFICATION SERVICE IN CLOUD COMPUTING SYSTEM

(71) Applicant: EMC IP Holding Company LLC, Hopkinton, MA (US)

(72) Inventors: Yingying Wang Martin, Southborough, MA (US); Scott E. Joyce, Foxboro, MA (US); Scott R. Akerman, Raleigh, NC (US); Norman M. Miles, Bedford, MA (US); Dan Yuan, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 16/671,874

(22) Filed: Nov. 1, 2019

(65) Prior Publication Data
US 2021/0135971 A1    May 6, 2021

(51) Int. Cl.
*H04L 12/26* (2006.01)
*H04L 29/08* (2006.01)
*H04L 12/24* (2006.01)

(52) U.S. Cl.
CPC .......... *H04L 43/50* (2013.01); *H04L 41/0654* (2013.01); *H04L 41/145* (2013.01);
(Continued)

(58) Field of Classification Search
CPC . H04L 43/50; H04L 43/0805; H04L 43/0817; H04L 43/0811; H04L 43/0823;
(Continued)

(56) References Cited

U.S. PATENT DOCUMENTS 9,479,387 B2 * 10/2016 Arabo ............... H04L 29/08693
10,869,187 B1 * 12/2020 Herbert .................. H04W 8/08
(Continued)

OTHER PUBLICATIONS

Dell EMC, "A Proactive Monitoring and Analytics Application for Dell EMC Storage Systems," CloudIQ Detailed Review, Jan. 2019, 42 pages.

*Primary Examiner* — Kevin D Mew
(74) *Attorney, Agent, or Firm* — Ryan, Mason & Lewis, LLP (57) ABSTRACT

Techniques are provided for automatically testing and verifying the functionality of push notification services of a cloud computing system. For example, a computing system performs an automated push notification test to test a push notification service of the computing system. The computing system sends a test push message over a communications network to a plurality of test devices that are located in different geolocations. The test devices are configured to automatically generate a response message in response to receiving the test push message. The computing system determines if a response message is received from each test device within a predefined response timeout period associated with the test device. The computing system determines that the push notification test fails in response to determining that a response message is not received from at least one test device within the predefined response timeout period associated with the at least one test device.

20 Claims, 4 Drawing Sheets

(52) U.S. Cl.
CPC ...... *H04L 43/0817* (2013.01); *H04L 43/0823* (2013.01); *H04L 43/106* (2013.01); *H04L 67/26* (2013.01)

(58) Field of Classification Search
CPC . H04L 43/106; H04L 41/0654; H04L 41/145; H04L 67/26
See application file for complete search history.

(56) References Cited

U.S. PATENT DOCUMENTS

| | | | |
|---|---|---|---|
| 10,936,358 B2* | 3/2021 | Chan | G06F 9/4825 |
| 2011/0022689 A1* | 1/2011 | Piepenbrink | H04L 12/4679 |
| | | | 709/221 |
| 2013/0047034 A1* | 2/2013 | Salomon | G06Q 20/3224 |
| | | | 714/18 |
| 2013/0346521 A1* | 12/2013 | Arabo | H04L 29/08693 |
| | | | 709/206 |
| 2015/0287310 A1* | 10/2015 | Deliuliis | G08B 21/10 |
| | | | 340/628 |
| 2016/0191318 A1* | 6/2016 | Neilson | G06F 8/00 |
| | | | 709/220 |
| 2016/0283352 A1* | 9/2016 | Kraus | H04L 41/00 |
| 2017/0331707 A1* | 11/2017 | Grinkemeyer | H04H 20/12 |
| 2018/0137316 A1* | 5/2018 | Fischer | G06K 7/10366 |
| 2018/0302483 A1* | 10/2018 | Mild | H04L 63/083 |
| 2018/0338187 A1* | 11/2018 | Ketonen | H04N 21/64738 |
| 2020/0145301 A1* | 5/2020 | Grinkemeyer | H04L 43/045 |
| 2020/0167270 A1* | 5/2020 | Yang | G06F 11/3688 |
| 2021/0075875 A1* | 3/2021 | Liu | G06F 16/24575 |

* cited by examiner

AUTOMATED TESTING OF PUSH NOTIFICATION SERVICE IN CLOUD COMPUTING SYSTEM

FIELD

This disclosure relates generally to techniques for verifying the functionality of push notification services in a cloud computing system.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, Software-as-a-Service (SaaS), Infrastructure-as-a-Service (IaaS), and/or Platform-as-a-Service (PaaS). A cloud computing system implements an application programming interface (API) to enable various applications and computing platforms to communicate with and access the cloud computing system, or otherwise allow other applications and computing platforms to integrate within the cloud computing system.

In certain instances, cloud computing services such as SaaS are configured to push notification messages to customers to provide information regarding the services that are provided to the customers. Typically, there are many components in a push notification pipeline which must operate in a seamless and cooperative manner to successfully send mobile push notifications to customers. A failure on the part of any one of these components can result in a large number of end-users or customers not receiving important service notifications, which is problematic for various reasons.

SUMMARY

Exemplary embodiments of the disclosure include methods for automatically testing and verifying the functionality of push notification services of a cloud computing system. For example, one embodiment includes a method that is implemented by a computing system which comprises performing an automated push notification test to test a push notification service of the computing system. The computing system sends a test push message over a communications network to a plurality of test devices that are located in different geolocations, wherein each test device is configured to automatically generate a response message in response to receiving the test push message. The computing system determines if a response message is received from each test device of the plurality of test devices within a predefined response timeout period associated with the test device. The computing system determines that the push notification test fails in response to determining that a response message is not received from at least one test device within the predefined response timeout period associated with the at least one test device.

In another embodiment, the computing system analyzes message content of each response message received from each test device of the plurality of test devices to determine if the message content is valid. The computing system determines that the push notification test fails in response to determining that a response message received from at least one test device comprises invalid message content.

Other embodiments of the disclosure include, without limitation, computing systems and articles of manufacture comprising processor-readable storage media for automatically testing and verifying the functionality of push notification services of a cloud computing system.

DETAILED DESCRIPTION

Figure 1:
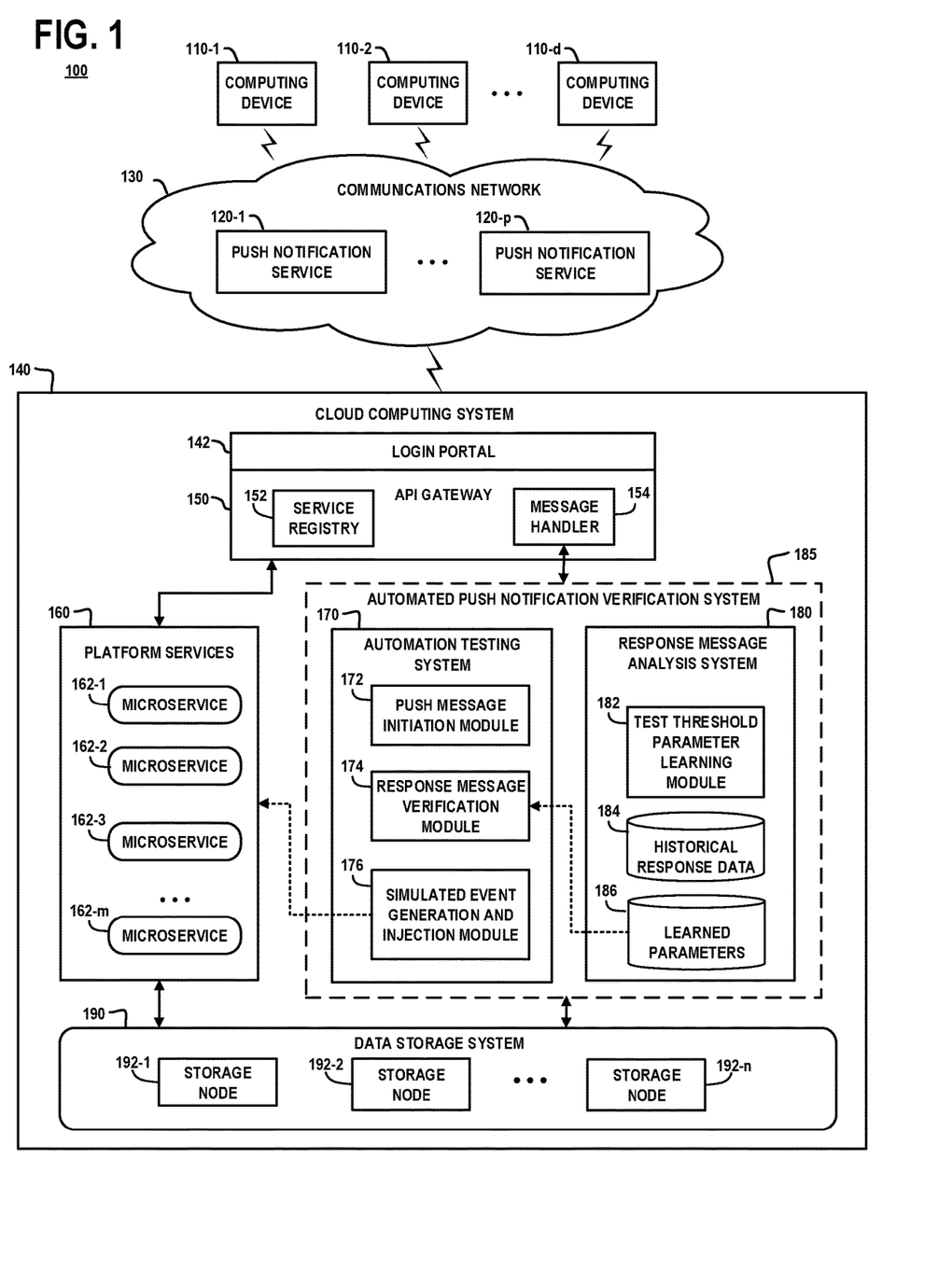
FIG. 1 is a high-level schematic illustration of a cloud computing system which implements an automated push notification verification system, according to an embodiment of the disclosure.

Exemplary embodiments of the disclosure will now be described in further detail with regard to systems and methods for automatically testing and verifying the functionality of push notification services of a cloud computing system. For example, FIG. 1 is a high-level schematic illustration of a cloud computing system which implements an automated push notification verification system, according to an embodiment of the disclosure. In particular, FIG. 1 depicts a system 100 which comprises a plurality of computing devices 110-1, 110-2, . . . , 110-*d* (collectively, computing devices 110), a plurality of push notification services 120-1, . . . , 120-*p* (collectively, push notification services 120), a communications network 130, and a cloud computing system 140.

The cloud computing system 140 comprises a user login portal 142, and an API gateway 150 which comprises a service registry 152, and a message handler 154. The cloud computing system further comprises an application platform 160 (e.g., platform services), an automation testing system 170, and a response message analysis system 180. The automation testing system 170 and the response message analysis system 180 comprise various components that collectively implement an automated push notification verification system 185. In particular, the automation testing system 170 comprises a push message initiation module 172, a response message verification module 174, and a simulated event generation and injection module 176. The response message analysis system 180 comprises a test threshold parameter learning module 182, and maintains a database of historical response data 184 and a database of learned test parameters 186.

As explained in further detail below, the automated push notification verification system 185 is configured to continually operate in the background by (i) causing push notification messages to be periodically transmitted to the computing devices 110 and (ii) analyzing response messages received from the computing devices 110 in response to the push notification messages, to verify whether or not the push notification service of the cloud computing system 140 is operating as expected. For example, the automated push notification verification system 185 can analyze various aspects of the push notification messages transmitted and the response messages received, such as the latency of delivering the push notification messages to the computing devices 110, the latency in receiving response messages from the computing devices 110, a payload content of the response messages, etc. In some embodiments, verification fails when, e.g., a timeout occurs or the payload content of a response message is not as expected, etc. When the push message notification service is determined to be operating improperly or inefficiently, the automated push notification verification system 185 will automatically send an email notification to the responsible administrators and/or developers so that appropriate action can be taken quickly.

The computing devices 110 include various types of computing systems or devices such as a desktop computer, a laptop computer, a workstation, a computer server, a smart phone, an electronic tablet, etc. In some embodiments, the computing devices 110 are utilized as dedicated test devices which are globally dispersed at different geolocations around the world to verify the functionality of the push notification services of the cloud computing system 140 with regard to the different geolocations. For example, the computing devices 110 are located in different geographic locations such as different continents of the world, different countries, different regions within a given continent, different regions within a given country, etc., or any combination thereof. In some embodiments, each computing device 110 is configured to execute a test application that is configured to communicate with the cloud computing system 140 over the communication network 130. The test application is configured to receive push messages from the cloud computing system 140, and to automatically generate and transmit response messages to the cloud computing system 140 for analysis and verification by the automated push notification verification system 185.

While the communications network 130 is generically depicted in FIG. 1, it is to be understood that the communications network 130 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols.

The push notification services 120 represent "third-party" push services that are utilized by the could computing system 140 to push notification messages to customers that have certain types of computing devices. For example, the push notification services 120 can implement a Firebase Cloud Messaging (FCM) system that is configured to deliver messages to, e.g., an Android device, an Apple Push Notification service (APNs) platform that is configured to deliver messages to an iOS device, and other commercially available push messaging platforms, etc.

The cloud computing system 140 is configured to perform data processing, data storage, and data management functions to support one or more cloud-based or web-based applications or services and/or other types of applications that are implemented by the application platform 160. The data storage system 190 comprises a plurality of data storage nodes 192-1, 192-2, . . . , 192-*n* (collectively, data storage nodes 192). The data storage system 190 can be implemented using any suitable data storage system, or combination of data storage systems, including, but not limited to storage area network (SAN) systems, Hadoop Distributed File System (HDFS), as well as other types of data storage systems comprising clustered or distributed virtual and/or physical infrastructure. In some embodiments, the data storage nodes 192 comprise storage appliances with memory controllers, processors, cache memory, and non-volatile storage media to provide persistent storage resources (e.g., file repositories, databases, etc.) for the application platform 160 and other computing nodes of the cloud computing system 140.

The data storage devices of the data storage nodes 192 may include one or more different types of persistent storage devices, or data storage arrays, such as hard disk drives or solid-state drives, or other types and combinations of non-volatile memory. In one embodiment, the data storage nodes 192 are implemented using, for example, an enterprise-class storage platform comprising high-performance, scalable storage arrays, which can be implemented for hyper-scale computing systems. For example, the data storage system 190 can be implemented using commercially available storage array systems and applications.

In the exemplary embodiment of FIG. 1, the application platform 160 comprises a microservices-based architecture which includes plurality of microservices 162-1, 162-2, 162-3, . . . , 162-*m* (collectively, microservices 162) that are combined to provide a structured application. As is known in the art, a microservices-based framework implements an application as a collection of loosely-coupled services, wherein the services expose fine-grained APIs and lightweight protocols. Each microservice 162-1, 162-2, 162-3, . . . , 162-*m* comprises a self-contained software module with associated functionality and interfaces. In some embodiments, the microservice-based application platform 160 runs in a virtualized environment (e.g., virtual machines) or a containerized environment (e.g., containers) in which the number of instances of a given microservice and the locations (e.g., host and port) of such instances change dynamically.

In the microservices architecture, each microservice 162 (and instances thereof) exposes a set of fine-grained endpoints to access resources provided by the microservice. Each endpoint specifies a location from which APIs can access the resources needed to perform functions. Each microservice 162 maintains its own database in the data storage system 190 in order to be decoupled from other microservices. Data consistency between the distributed microservices 162 is implemented using known techniques such as the Saga pattern. The microservice-based framework enables the individual microservices 162 to be deployed and scaled independently, to be developed and updated in parallel by different teams and in different programming languages, and have their own continuous delivery and deployment stream.

While the application platform 160 is generically depicted in FIG. 1, the application platform 160 can implement any suitable cloud-based application. For example, in an exemplary embodiment, the application platform 160 implements a cloud-based application that allows customers to monitor, analyze, and troubleshoot their storage systems. However, the application platform 160 may comprise any other type of SaaS application which comprises hundreds of microservices and associated endpoints and provide services to end-users and customers, etc.

The login portal 142 and the API gateway 150 allow customers to access the individual microservices 162 of the application platform 160. More specifically, the login portal 142 comprises a user interface which implements methods that allow a user to connect to the cloud computing system 140 and login to the cloud computing system 140 and provide credentials for a user authentication/verification process. In some embodiments, the login portal comprises different user interfaces to support connectivity with different type of devices, e.g. mobile devices, desktop computers, servers, etc., and different types of HTML-based browsers.

The API gateway 150 implements methods that are configured to enable client applications to access the services of the microservices-based application platform 160. In particular, the API gateway 150 provides a single entry point for client applications to issue API requests for services that that are provided by the application platform 160. The API gateway 150 abstracts the client applications from knowing how the application platform 160 is partitioned into microservices, and from having to determine the locations of service instances. The API gateway 150 comprises logic for calling one or more of the microservices 162 in response to a client request. The API gateway 150 communicates with client applications and the microservices 162 using any suitable API framework. For example, in some embodiments, the API gateway 150 and the microservices 162 implement a REST API. In other embodiments, the API gateway 150 and the microservices 162 implement a SOAP API.

In some embodiments, the API gateway 150 is implemented using a single gateway service that is configured to interface with many different types of client applications (e.g., web-based applications, mobile applications, etc.). In other embodiments, the API gateway 150 comprises a plurality of gateway services, each configured to interface with a different type of client application. In all instances, the API gateway 150 performs various functions. For example, the API gateway 150 functions as a reverse proxy to redirect or route requests from client applications to target endpoints of the microservices 162. In this instance, the API gateway 150 provides a single endpoint or Uniform Resource Locator (URL) to receive requests from client applications for access to services of the application platform 160, and internally maps client requests to one or more of the microservices 162.

Furthermore, the API gateway 150 implements aggregation services to aggregate multiple client requests (e.g., HTTP requests) which target multiple microservices 162 into a single request. In this instance, a client application may send a single request to the API gateway 150 to perform a single task, and the API gateway 150 dispatches multiple calls to different backend microservices 162 to execute the task. The API gateway 150 aggregates the results from the multiple microservices and sends the aggregated results to the client application. In this instance, the client application issues a single request and receives a single response from the API gateway 150 despite that the single request is parsed and processed by multiple microservices 162. The API gateway 150 can be configured to implement other functions or microservices to implement authentication and authorization, service discovery, response caching, load balancing, etc.

The service registry 152 generates and maintains a database of microservices 162 of the application platform 160, including a list of all instances of the microservices 162 and the locations of all instances of the microservices 162. Each microservice 162 of the application platform 160 will maintain a list of its valid API endpoints (e.g., REST endpoints) including the paths, methods, headers, URL parameters, supported parameter values, etc., of the API endpoints of the microservice 162. During service startup, the instances of the microservices 162 will push their API endpoint information to the service registry 152. The microservice instances are registered with the service registry 152 on startup and then deregistered on shutdown. The microservices registration information is leveraged in various ways. For example, the API gateway 150 utilizes the registration information to identify available instances of the microservices 162 and their locations to support client request routing and load balancing functions.

In general, the automated push notification verification system 185 is configured to implement an automated push notification testing and verification process which provides a continuous feedback loop and global insight of push notifications that are sent to the different test computing devices 110 that are globally dispersed. The test computing devices 110 are configured to receive and respond to push messages that are periodically triggered by the automation testing system 170. In response to receiving test push messages, the test computing devices 110 are configured to make API calls (e.g., send a response message) to the cloud computing system 140, wherein the API calls comprise payload content responsive to, or otherwise associated with, the test push message.

The automated push notification verification system 185 can validate the payload to verify the remote push notification system is operating properly and as expected. In some embodiments, verification of the push notification service will fail if a response timeout occurs with regard to receiving an API call from one or more test computing devices 110, and/or if the payload content of the response message (e.g., API call) is invalid and not as expected. A test fail notification (e.g., e-mail) will be immediately sent to individuals who are responsible for managing the push notification services of the cloud computing system 140 so that immediate action can be taken to remedy any problem.

The automated push notification verification system 185 eliminates the need for developers to manually monitor the functioning of the remote push notification service on a constant basis, and further reduces the time to debug and fix mobile push notification issues. The dispersing of the test computing devices 110 at different geolocations around the globe, allows the automated push notification verification system 185 to, e.g., (i) detect location specific issues, (ii) detect and trend receipt time differences, (iii) track push notification latency over time, (iv) promote better user experience, etc.

In some embodiments, the message handler 154 comprises an API that is part of the API gateway 150. The message handler 154 is configured to handle outgoing push messages that are sent to the third-party push notification services 120, and to handle incoming response messages that are received from the test computing devices 110. The message handler 154 is configured to redirect response messages to the automated push notification verification system 185, which are received in response to test push messages that are initiated by the automated push notification verification system 185.

The automation testing system 170 is configured to perform various types of automation testing on the services, functions, components, etc. of the cloud computing system 140. In accordance with embodiments of the disclosure, the automation testing system 170 is configured to automatically perform push notification test procedures to automatically test and verify the operation of the push notification services provided by the cloud computing system 140 on a periodic, scheduled basis. The automation testing system 170 can be configured to schedule a push notification test to be performed on a continual, periodic basis such as every minute, every 10 minutes, every 30 minutes, every hour, several times a day, once a day, etc. In addition, the scheduling for push notification testing can vary for different test computing devices 110 in different geolocations.

The automation testing system 170 implements different types of push notification tests using the push message initiation module 172 and the simulated event generation and injection module 176. The push notification tests cause test push messages to be sent to the computing devices 110 located in the different geolocations. In response to receiving a test push message, the computing devices 110 are configured to automatically generate and send response messages back to the cloud computing system 140. The response message verification module 174 is configured to analyze response messages that are received from the computing device 110 and determine if the push notification services of the cloud computing system 140 are operating as expected.

In particular, the push message initiation module 172 comprises an API that is periodically called by the automation testing system 170 to generate a generic test push message that is sent to one or more or all of the test computing devices 110. More specifically, in some embodiments, the push message initiation module 172 can be configured to generate and initiate the transmission of a generic "ping" notification message to the test computing devices 110 for the purpose of verifying the functionality and connectivity of the end-to-end push message pipeline between the computing system 140, the push notification services 120 and the test computing devices 110, and to determine the round-trip latency including the time for transmitting test push messages to the computing devices 110 in different geolocations and the time for receiving corresponding response messages from the test computing devices 110.

In this test configuration, a generic test push message can include a test push message ID and a timestamp that indicates a time that that push message was transmitted. The response message received from each computing device 110 can include the test push message ID, a timestamp of when the given computing device 110 received the test push message, and a device ID which uniquely identifies the computing device 110 which generated the response message. The response messages that are generated in response to generic test push messages are analyzed by the response message verification module 174 to determine if the push notification system is operating as expected.

For example, the response message verification module 174 can verify that a response message was generated and received from each computing device 110 in response to the test push message. In this instance, the response message verification module 174 can verify a completion of the end-to-end cycle of the push notification test when a response message is received from each computing device 110 to which the test push message was sent. If a response message is not received from one or more computing device 110 to which the test push message was sent, the response message verification module 174 can fail the push notification test. The automation testing system 170 will then send a notification of the failed test to the administrators and/or developers who are responsible for managing the push message services of the cloud computing system 140.

In addition, for each response message received from each computing device 110, the response message verification module 174 can determine the end-to-end response time for each of the computing devices 110. In particular, the response message verification module 174 has knowledge of (i) the start time of the test push message (e.g., the time when the push message was generated); (ii) the time of receipt of the test push message by a given computing device (e.g., the push message receipt timestamp included in the response message received from the given computing device), and (iii) the time of receipt of the response message received from the given computing device 110. With this time information, the response message verification module 174 can determine (i) the latency in sending the test push message through the push notification pipeline from the cloud computing system 140 to the given computing device 110 and (ii) the latency in generating and sending the response message from the given computing device 110 to the cloud computing system 140. These latencies are used to determine the end-to-end response time of the given computing device.

In some embodiments, the response message verification module 174 is configured to compare the determined end-to-end response time of a given computing device 110 to a threshold value (e.g., response timeout value). If the determined end-to-end response time of the given computing device 110 exceeds the threshold response timeout value, the response message verification module 174 can fail the push notification test at least with respect to the given computing device 110. The automation testing system 170 will then send a notification of the failed test to the administrators and/or developers who are responsible for managing the push message services of the cloud computing system 140.

In some embodiments, the threshold response timeout value can be a default value that is applied for all the test computing devices 110. In some embodiments, the threshold response timeout value can be a learned value (e.g., average value) which is determined based on historical response time data. In some embodiments, different threshold response time values can be utilized for different types of devices among the test computing devices 110. In addition, different threshold response time values can be specified to verify the end-to-end response times of test computing devices 110 that are located in different geolocations to take into account differences in the distance between the geolocation of the cloud computing system 140 and the different geolocations of the test computing devices 110.

The simulated event generation and injection module 176 implements methods that are configured to generate a simulated event, and inject the simulated event to a service (e.g., one or more microservices 162) of the cloud computing system 140. The simulated event is configured to trigger the service to generate and send a push message to the test computing devices 110. This operating mode of the automated push notification verification system 185 serves to test the logic and functionality of the various microservices 162 with respect to properly responding to triggering events and sending proper notification messages customers.

For example, the simulated event may be an event that indicates a change in a configuration of a storage system monitored by the computing system 140 or a change in a health score of a storage system monitored by the computing system 140. In this operating mode, the response message verification module 174 is configured to analyze the message content of each response message received from each test computing device 110 to determine if the message content comprises a valid response to the simulated event.

The response message verification module 174 will fail the push notification test if the response messages from one or more of the test computing devices do not comprise a valid response to the simulated event.

The response message analysis system 180 is a service that is configured to capture, aggregate and analyze historical information with regard to response messages that are received from the test computing devices 110 over time to learn test threshold parameters which are utilized by the response message verification module 174 to verify if the push notification service is working properly. For example, the database of historical response data 184 can be configured to maintain, e.g., response messages that are received from the test computing devices 110 as a result of automated push notification tests that are performed over time, end-to-end response times that are determined by the response message verification module 174, and other historical response message data that can be utilized to determine test parameters that are indicative of acceptable behaviors of the push notification service.

The test threshold parameter learning module 182 implements methods that are configured to analyze the historical response data within the database 184 and determine or otherwise learn test parameters that can be utilized by the response message verification module 174 to analyze response messages received from the computing devices 110 and verify if the push notification service is working as expected. The learning test parameters are maintained in the parameter database 186. For example, the test threshold parameter learning module 182 can analyze the historical response data within the database 184 to determine trends in end-to-end response times of the computing devices 110 over time. This allows the test threshold parameter learning module 182 to learn average response times for the computing devices 110, collectively and/or individually, and use such information to select (and periodically update) the response message timeout values that are applied to the computing devices 110, either collectively or individually.

For example, a default response message timeout value (e.g., 1 minute) can be initially set and utilized by the response message verification module 174 to analyze the end-to-end response time for the computing devices 110. However, the test threshold parameter learning module 182 may determine that the average end-to-end response time for a given test computing device 110 in a given location is greater than the default value (or a currently applied value). In this instance, the response message timeout value for the given test computing device can be set to the determined average end-to-end response time and, thus, utilized as a threshold parameter for pass/fail verification of response messages received from the given test computing device.

Figure 2:
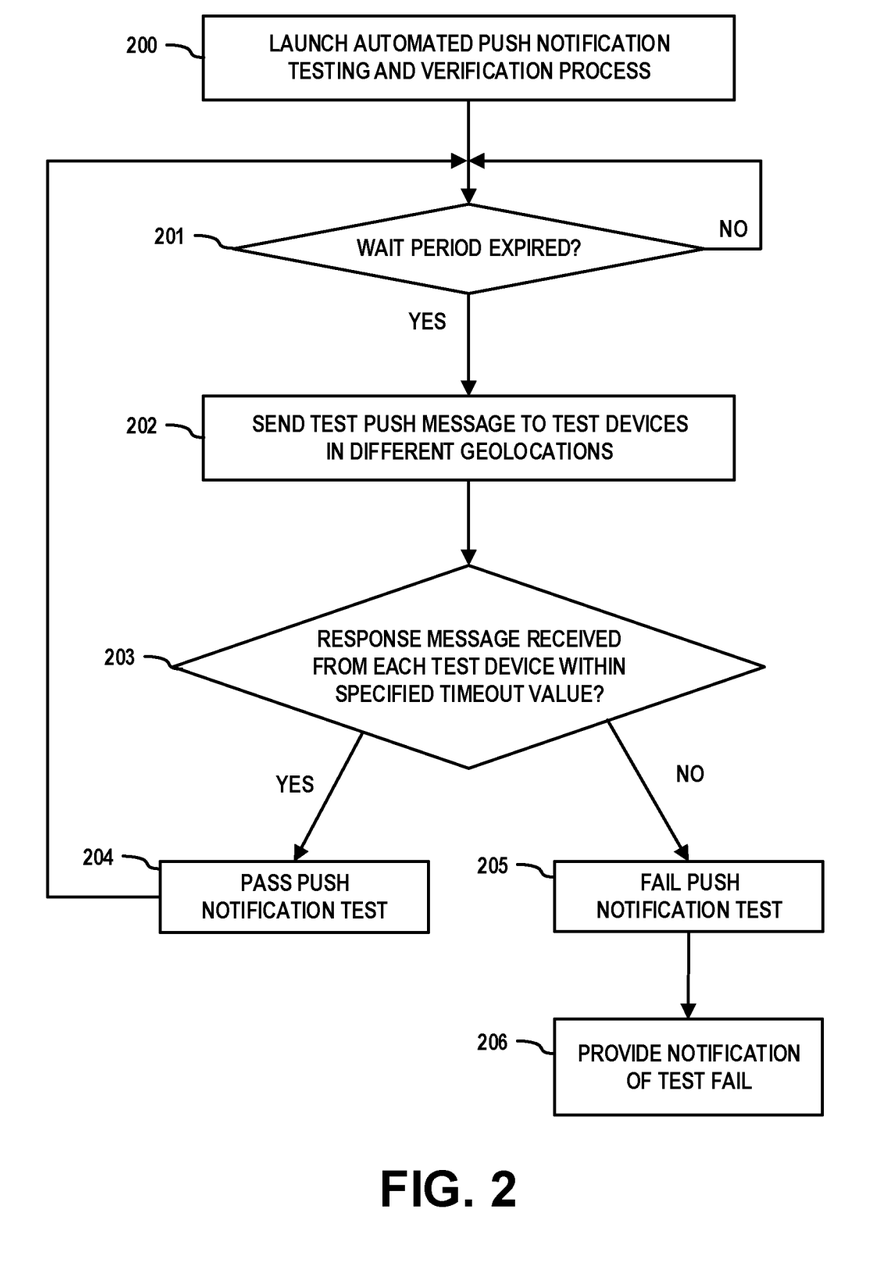
FIG. 2 is a flow diagram of a method for automatically testing and verifying a push notification service in a cloud computing system, according to an embodiment of the disclosure.

FIG. 2 is a flow diagram of a method for automatically testing and verifying a push notification service in a cloud computing system, according to an embodiment of the disclosure. For illustrative purposes, it is assumed that FIG. 2 illustrates an exemplary mode of operation of the automated push notification verification system 185 of FIG. 1. The process begins by launching an automated push notification testing and verification process which is implemented using, e.g., the push message initiation module 172 and the response message verification module 174 (block 200). At the expiration of a given wait period (affirmative determination in block 201), the push message initiation module 172 will cause a test push message to be sent to the plurality of test computing devices 110 which are located in different geolocations (block 202). As noted above, in some embodiments, the test push message that is generated comprises a test push message ID to uniquely identify the test push message, and a timestamp to indicate when the test push message was transmitted.

The response message verification module 174 will expect to receive a response message from each test computing device 110 to which the test push message was sent. As noted above, assuming that a given test computing device receives the test push message, the given test computing device will generate response message which comprises the unique device ID of the given test device, and a timestamp of when the test push message was received by the given test device. Each test computing device 110 is configured to call an API of the cloud computing system 140 to send the response message to the cloud computing system 140.

If the response message verification module 174 determines that a valid response message is received from each test computing device 110 within a specified timeout threshold value (affirmative determination in block 203), the response verification module 174 will pass the push notification test (block 204). Thereafter, push notification tests will be repeated on a continual basis according to the predefined wait period. As noted above, in some embodiments, the specified timeout threshold value is applied to all test computing devices. In other embodiments, each test computing device, or group of computing devices, can have a different timeout threshold value which represents, e.g., a learned average end-to-end response time for that computing device or group of computing devices.

On the other hand, if the response message verification module 174 determines that a valid response message is not received from one or more of the test computing devices 110 within the specified timeout threshold value (negative determination in block 203), the response verification module 174 will fail the push notification test (block 205), and a notification message of the push notification test fail will be generated and sent to the administrators and/or developers that are responsible for managing the push notification service of the cloud computing system 140 (block 206).

In some instances, a response message may never be received by a given test computing device, which can prompt some appropriate action to determine if there is a malfunction of the given test computing device itself, or a network outage in the geolocation where the test computing device is located. In other instances, a response message of a given test computing device may be untimely received (after the timeout value). However, if this problem persists over many test cycles, the system may proceed to increase the timeout value that is specified for the given test computing device to take into account a current trend in which the average end-to-end response time for the given test computing device has increased.

Figure 3:
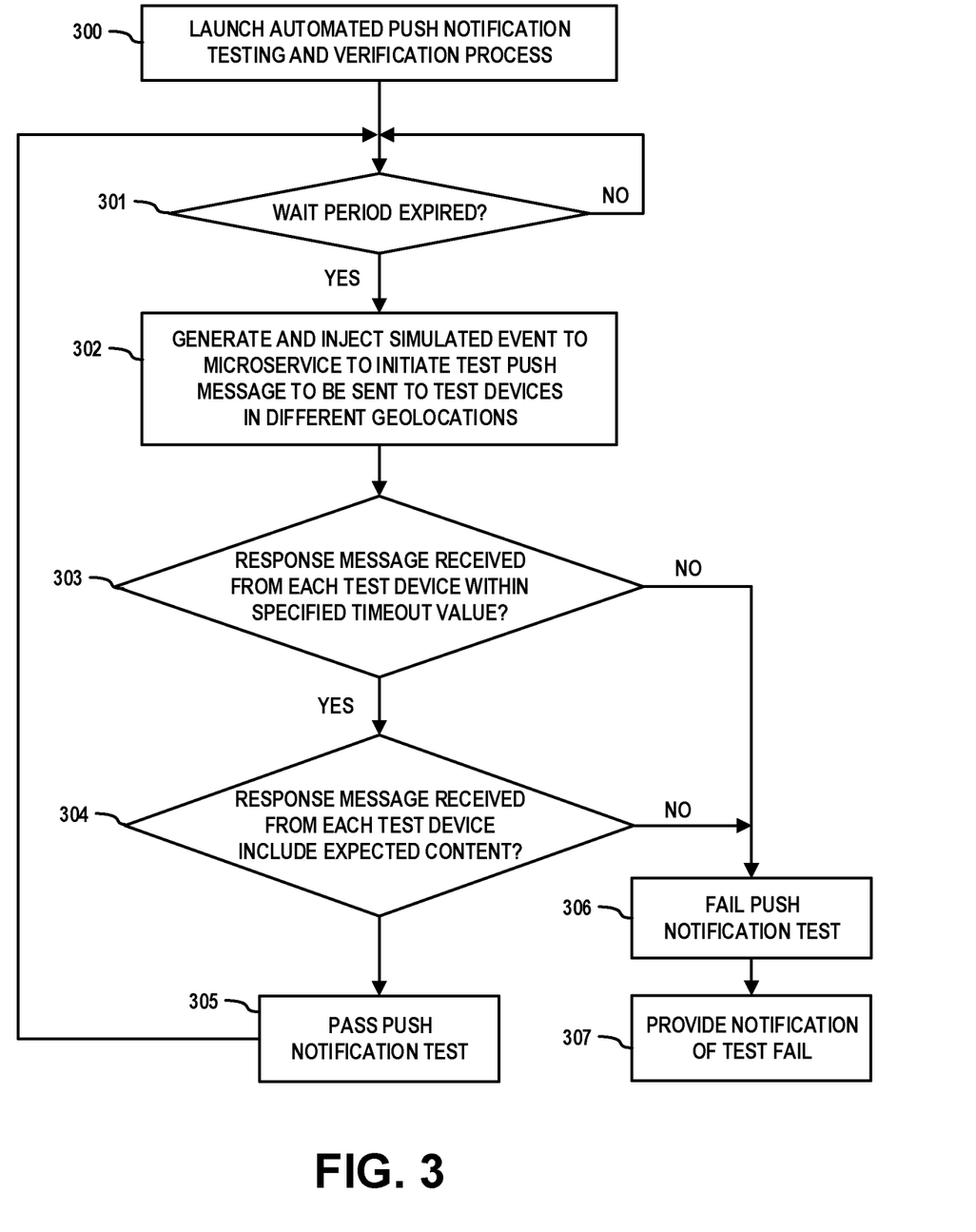
FIG. 3 is a flow diagram of a method for automatically testing and verifying a push notification service in a cloud computing system, according to another embodiment of the disclosure.

FIG. 3 is a flow diagram of a method for automatically testing and verifying a push notification service in a cloud computing system, according to another embodiment of the disclosure. For illustrative purposes, it is assumed that FIG. 3 illustrates another exemplary mode of operation of the automated push notification verification system 185 of FIG. 1. The process begins by launching an automated push notification testing and verification process which is implemented using, e.g., the simulated event generation and injection module 176 and the response message verification module 174 (block 300). At the expiration of a given wait period (affirmative determination in block 301), the simulated event generation and injection module 176 will generate a simulated event and inject the simulated event to a microservice 162 of the application platform 160 to cause the microservice to generate and send a push message to the plurality of test computing devices 110 which are located in different geolocations (block 302). As noted above, the simulated event comprises any type of event (e.g., change in storage system health score, change in storage system configuration, etc.) which triggers the microservice to generate a push message to notify an end-user or customer of the event. The push message that is generated will include content which identifies the event, the system ID associated with the event, a push message ID to uniquely identify the push message, a timestamp to indicate when the test push message was transmitted, etc.

The response message verification module 174 will expect to receive a response message from each test computing device 110 to which the test push message was sent. As noted above, assuming that a given test computing device receives the test push message, the given test computing device will generate response message which comprises the unique device ID of the given test device, a timestamp of when the test push message was received by the given test device, and message content (e.g., payload) that the test computing device is expected to include in the response message based on the content of the push message. As noted above, each test computing device 110 is configured to call an API of the cloud computing system 140 to send the response message to the cloud computing system 140.

The response message verification module 174 will determine if a response message is received from each test computing device 110 within a specified timeout threshold value (block 303) and determine if the response messages received from the test computing devices include the expected message content (block 304). If the response message verification module 174 determines that a response message was timely received from each test computing device (affirmative determination in block 303), and that the response messages received from the test computing devices include the expected message content (affirmative determination in block 304), the response message verification module 174 will pass the push notification test (block 305). Thereafter, push notification tests will be repeated on a continual basis according to the predefined wait period. As noted above, in some embodiments, the specified timeout threshold value is applied to all test computing devices. In other embodiments, each test computing device, or group of computing devices, can have a different timeout threshold value which represents, e.g., a learned average end-to-end response time for that test computing device or group of test computing devices.

On the other hand, if the response message verification module 174 determines that a response message was not timely received from one or more of the test computing devices (negative determination in block 303), or that the response messages received from the test computing devices do not include the expected message content (negative determination in block 304), the response verification module 174 will fail the push notification test (block 306), and a notification message of the push notification test fail will be generated and sent to the administrators and/or developers that are responsible for managing the push notification service of the cloud computing system 140 (block 307).

In some instances, a response message may never be received by a given test computing device, which can prompt some appropriate action to determine if there is a malfunction of the given test device itself, or a network outage in the geolocation where the test computing device is located. In some instances, a response message may never be received from any of the test computing devices, which can prompt some appropriate action to determine if there is a malfunction of the microservice that was expected to generate push messages to the test devices in response to the injection of the simulated event. In other instances, the response messages received from the test computing devices may include message content that is deemed invalid or which is unexpected. This will prompt some appropriate action to determine if there is a malfunction of the microservice that was expected to generate push messages with certain content that would have triggered the generation of response messages with an expected payload.

Figure 4:
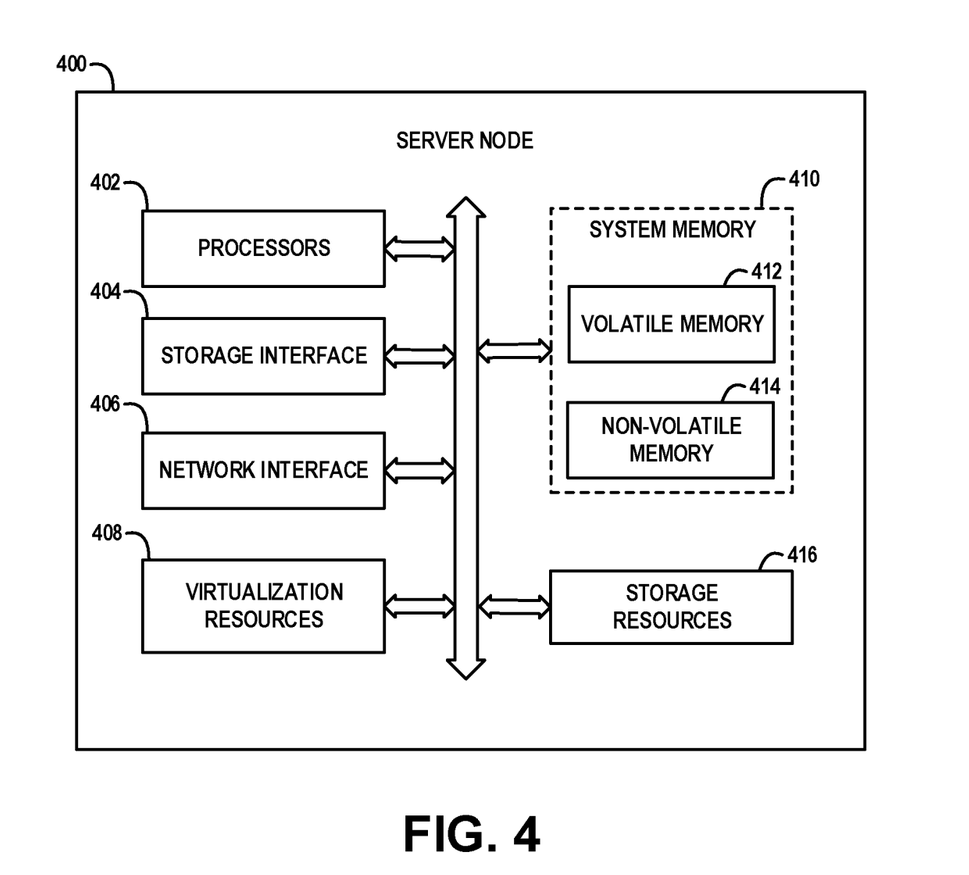
FIG. 4 schematically illustrates framework of a server node which can be implemented for hosting an automated push notification verification system, according to an exemplary embodiment of the disclosure.

It is to be understood that the various software modules of the automated push notification verification system 185 of FIG. 1 can be implemented on one or more server nodes. For example, FIG. 4 schematically illustrates framework of a server node which can be implemented for hosting the automated push notification verification system 185 of FIG. 1, according to an exemplary embodiment of the disclosure. The server node 400 comprises processors 402, storage interface circuitry 404, network interface circuitry 406, virtualization resources 408, system memory 410, and storage resources 416. The system memory 410 comprises volatile memory 412 and non-volatile memory 414.

The processors 402 comprise one or more types of hardware processors that are configured to process program instructions and data to execute a native operating system (OS) and applications that run on the server node 400. For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various modules and functionalities of the automated push notification verification system 185 of FIG. 1 as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well the various modules and functionalities of the automated push notification verification system 185 of FIG. 1 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the automated push notification verification system 185 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of a NAND Flash storage device, a SSD device, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
performing, by a computing system, an automated push notification test to test a push notification service of the computing system, wherein performing the automated push notification test comprises:
sending, by the computing system, a test push message over a communications network to each test device of a plurality of test devices that are located in different geolocations, wherein each test device is configured to (i) automatically generate a response message in response to receiving the test push message and (ii) automatically make an application programming interface (API) call to a test message handler of an API gateway of the computing system to provide the response message to the computing system;

determining, by the computing system, if a response message is received from each test device of the plurality of test devices within a predefined response timeout period associated with the test device; and determining, by the computing system, that the push notification test fails in response to determining that a response message is not received from at least one test device within the predefined response timeout period associated with the at least one test device.

2. The method of claim 1, wherein sending the test push message comprises automatically sending push test messages to each test device of the plurality of test devices on a periodic basis.

3. The method of claim 1, wherein a given test device of the plurality of test devices is accorded a predefined response timeout period that is determined, by the computing system, based on historical response times of the given test device.

4. The method of claim 1, wherein performing the automated push notification test further comprises:

analyzing, by the computing system, message content of each response message received from each test device of the plurality of test devices to determine if the message content is valid; and determining, by the computing system, that the push notification test fails in response to determining that a response message received from at least one test device of the plurality of test devices comprises invalid message content.

5. The method of claim 1, wherein sending the test push message comprises sending a generic test push message to each test device of the plurality of test devices, wherein the generic test push message comprises a push message identifier, and wherein each test device is configured to automatically generate a response message which comprises the push message identifier, in response to receiving the generic test push message.

6. The method of claim 1, wherein sending the test push message comprises:

generating a simulated event; and injecting the simulated event to a service of the computing system;

wherein the simulated event is configured to trigger the service to generate and send a push message to each test device of the plurality of test devices.

7. The method of claim 6, wherein the simulated event comprises an event that indicates one of (i) a change in a configuration of a storage system monitored by the computing system and (ii) a change in a health score of a storage system monitored by the computing system.

8. The method of claim 6, wherein performing the automated push notification test further comprises:

analyzing, by the computing system, message content of each response message received from each test device of the plurality of test devices to determine if the message content comprises a valid response to the simulated event; and determining, by the computing system, that the push notification test fails in response to determining that a response message from at least one test device does not comprise a valid response to the simulated event.

9. The method of claim 1, further comprising, in response to determining that the push notification test has failed, automatically sending, by the computing system, a test notification message to at least one entity responsible for managing the push notification service of the computing system, wherein the test notification message provides notification that the push notification test has failed.

10. An article of manufacture comprising a non-transitory processor-readable storage medium having stored therein program code of one or more software programs, wherein the program code is executable by one or more processors to implement a method comprising:

performing, by a computing system, an automated push notification test to test a push notification service of the computing system, wherein performing the automated push notification test comprises:

sending, by the computing system, a test push message over a communications network to each test device of a plurality of test devices that are located in different geolocations, wherein each test device is configured to (i) automatically generate a response message in response to receiving the test push message and (ii) automatically make an application programming interface (API) call to a test message handler of an API gateway of the computing system to provide the response message to the computing system;

determining, by the computing system, if a response message is received from each test device of the plurality of test devices within a predefined response timeout period associated with the test device; and determining, by the computing system, that the push notification test fails in response to determining that a response message is not received from at least one test device within the predefined response timeout period associated with the at least one test device.

11. The article of manufacture of claim 10, wherein sending the test push message comprises automatically sending push test messages to each test device of the plurality of test devices on a periodic basis.

12. The article of manufacture of claim 10, wherein a given test device of the plurality of test devices is accorded a predefined response timeout period that is determined, by the computing system, based on historical response times of the given test device.

13. The article of manufacture of claim 10, wherein performing the automated push notification test further comprises:

analyzing, by the computing system, message content of each response message received from each test device of the plurality of test devices to determine if the message content is valid; and determining, by the computing system, that the push notification test fails in response to determining that a response message received from at least one test device of the plurality of test devices comprises invalid message content.

14. The article of manufacture of claim 10, wherein sending the test push message comprises sending a generic test push message to each test device of the plurality of test devices, wherein the generic test push message comprises a push message identifier, and wherein each test device is configured to automatically generate a response message which comprises the push message identifier, in response to receiving the generic test push message.

15. The article of manufacture of claim 10, wherein sending the test push message comprises:

generating a simulated event; and injecting the simulated event to a service of the computing system;

wherein the simulated event is configured to trigger the service to generate and send a push message to each test device of the plurality of test devices.

16. The article of manufacture of claim 15, wherein the simulated event comprises an event that indicates one of (i) a change in a configuration of a storage system monitored by the computing system and (ii) a change in a health score of a storage system monitored by the computing system.

17. The article of manufacture of claim 15, wherein performing the automated push notification test further comprises:
   analyzing, by the computing system, message content of each response message received from each test device of the plurality of test devices to determine if the message content comprises a valid response to the simulated event; and
   determining, by the computing system, that the push notification test fails in response to determining that a response message from at least one test device does not comprise a valid response to the simulated event.

18. The article of manufacture of claim 10, further comprising, in response to determining that the push notification test has failed, automatically sending, by the computing system, a test notification message to at least one entity responsible for managing the push notification service of the computing system, wherein the test notification message provides notification that the push notification test has failed.

19. A server node, comprising:
   at least one processor; and
   system memory configured to store program code, wherein the program code is executable by the at least one processor to instantiate a push notification verification system which is configured to test a push notification service of a computing system, wherein the push notification verification system is configured to:
   send a test push message over a communications network to each test device of a plurality of test devices that are located in different geolocations, wherein each test device is configured to (i) automatically generate a response message in response to receiving the test push message and (ii) automatically make an application programming interface (API) call to a test message handler of an API gateway of the computing system to provide the response message to the computing system;
   determine if a response message is received from each test device of the plurality of test devices within a predefined response timeout period associated with the test device; and
   determine that the push notification test fails in response to determining that a response message is not received from at least one test device within the predefined response timeout period associated with the at least one test device.

20. The server node of claim 19, wherein the push notification verification system is configured to:
   analyze message content of each response message received from each test device of the plurality of test devices to determine if the message content is valid; and
   determine that the push notification test fails in response to determining that a response message received from at least one test device of the plurality of test devices comprises invalid message content.

* * * * *